US00H002081H

(19) United States

(12) Statutory Invention Registration

Lee

(10) Reg. No.: US H2081 H

(43) Published: Sep. 2, 2003

(54) SPIRAL COILS MADE FROM EXTRUDED HOLLOW TUBES AND THE FABRICS MADE THEREFROM

(75) Inventor: Henry James Lee, Summerville, SC (US)

(73) Assignee: AstenJohnson, Inc., Charleston, SC (US)

(21) Appl. No.: 09/503,685

(22) Filed: Feb. 14, 2000

(51) Int. Cl.[7] ..... D03D 15/00

(52) U.S. Cl. ..... 442/181

*Primary Examiner*—Charles T. Jordan

*Assistant Examiner*—Aileen J. Baker

(74) *Attorney, Agent, or Firm*—Volpe and Koenig, P.C.

(57) ABSTRACT

An apparatus for the creation of a spiral coil by extruding a hollow tube and cutting the tube in a fixed plane relative to the tube is provided. A fabric made from such spiral coils is also provided.

3 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SPIRAL COILS MADE FROM EXTRUDED HOLLOW TUBES AND THE FABRICS MADE THEREFROM

BACKGROUND

The present invention relates to spiral coils that can be interlaced to create fabrics or seams for use in the papermaking industry. It further relates to a method for extruding and cutting tubes to produce the coils.

It has been recognized in the prior art that spiral coils can be used to create all or part of a papermaking fabric. The most common spiral coils are made from extruded monofilaments that are thermally treated and wrapped about a mandrel for shaping into a helical form. The resultant coils and fabrics are sensitive to fluctuations in ambient temperature and moisture which leads to their destabilization in use. This tendency to destabilize is believed to be attributable to orientation of the polymer molecules in the monofilament along the longitudinal axis established during the monofilament extrusion process. Conventional prior art methods generally require a coiling process that limits them to certain materials. In addition, the coiled materials generally require further heat setting to achieve a flat or planer coil array. These conditions generally limit the coiling method to round or oval monofilaments which have lower surface contact areas.

SUMMARY

The invention is directed to an apparatus or the creation of a spiral coil by extruding a hollow tube and cutting the tube in a fixed plane relative to the tube. Additionally, the invention is directed to a fabric made from such spiral coils.

DETAILED DESCRIPTION OF THE PREFERRED EMBODIMENTS

Figure 1:
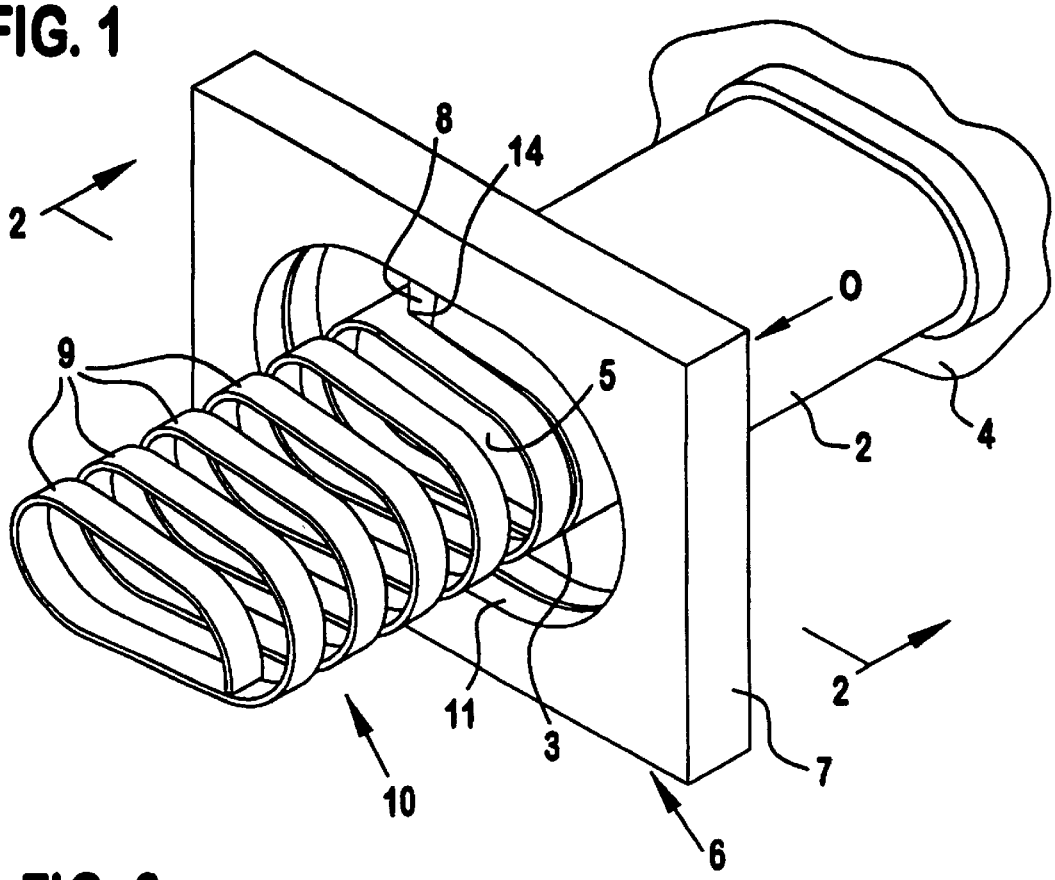
FIG. 1 is a perspective view of an apparatus for converting an extruded hollow tube into a spiral coil.

The present invention will be described with reference to the drawing figures wherein like numerals indicate like elements throughout.

In FIG. 1, a hollow tube 2 is shown having a wall 3 of a desired thickness that surrounds and defines a tube interior 5. The tube interior 5 is dimensioned to provide an approximately desired space between end curves 9 of a desired coil 10. Preferably, the tube 2 is extruded from an extruder 4 and is moved at a constant speed through the path of a cutting device 6, located in an opening 11 in a housing 7. Mounted within the housing 7 is a cutting tool 8 with a cutting edge 14. The tool 8 moves in a fixed plane that is perpendicular to the direction of travel of the tube 2. The tool 8 repeatedly navigates a path normal to the tube wall 3. The movement of the tube 2 through the perpendicular fixed plane and the movement of the cutting edge 14 in the plane are coordinated so that a uniform spiral coil 10 is cut from the tube 2.

Figure 2:
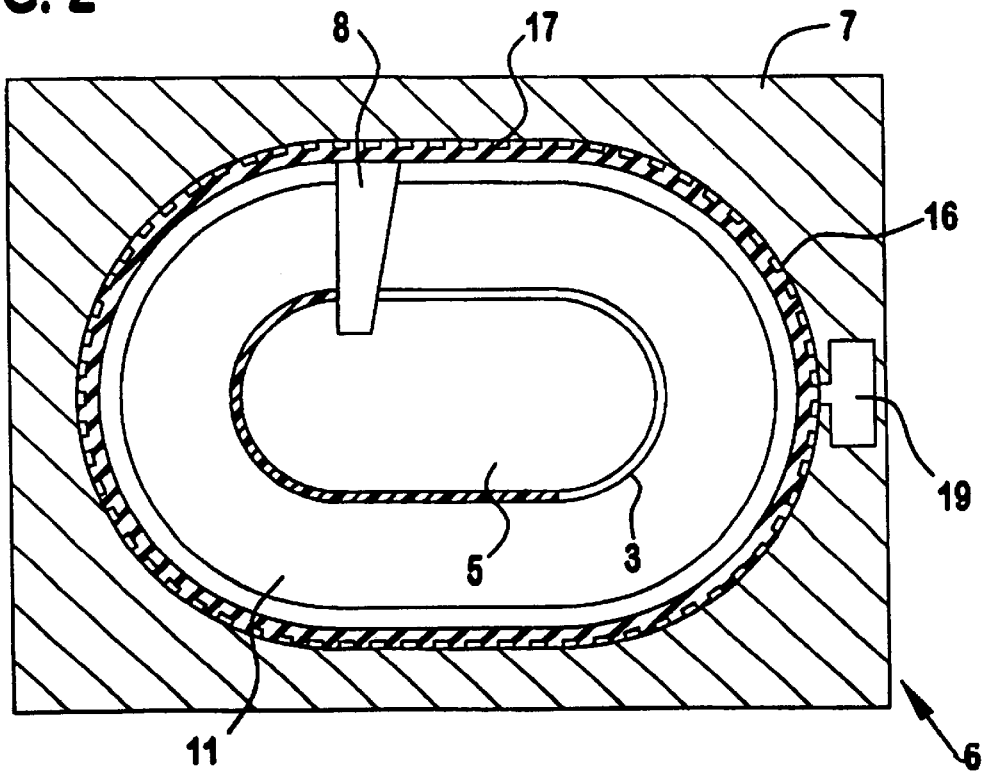
FIG. 2 is a cross-section taken along line 2—2 in FIG. 1.
Figure 3:
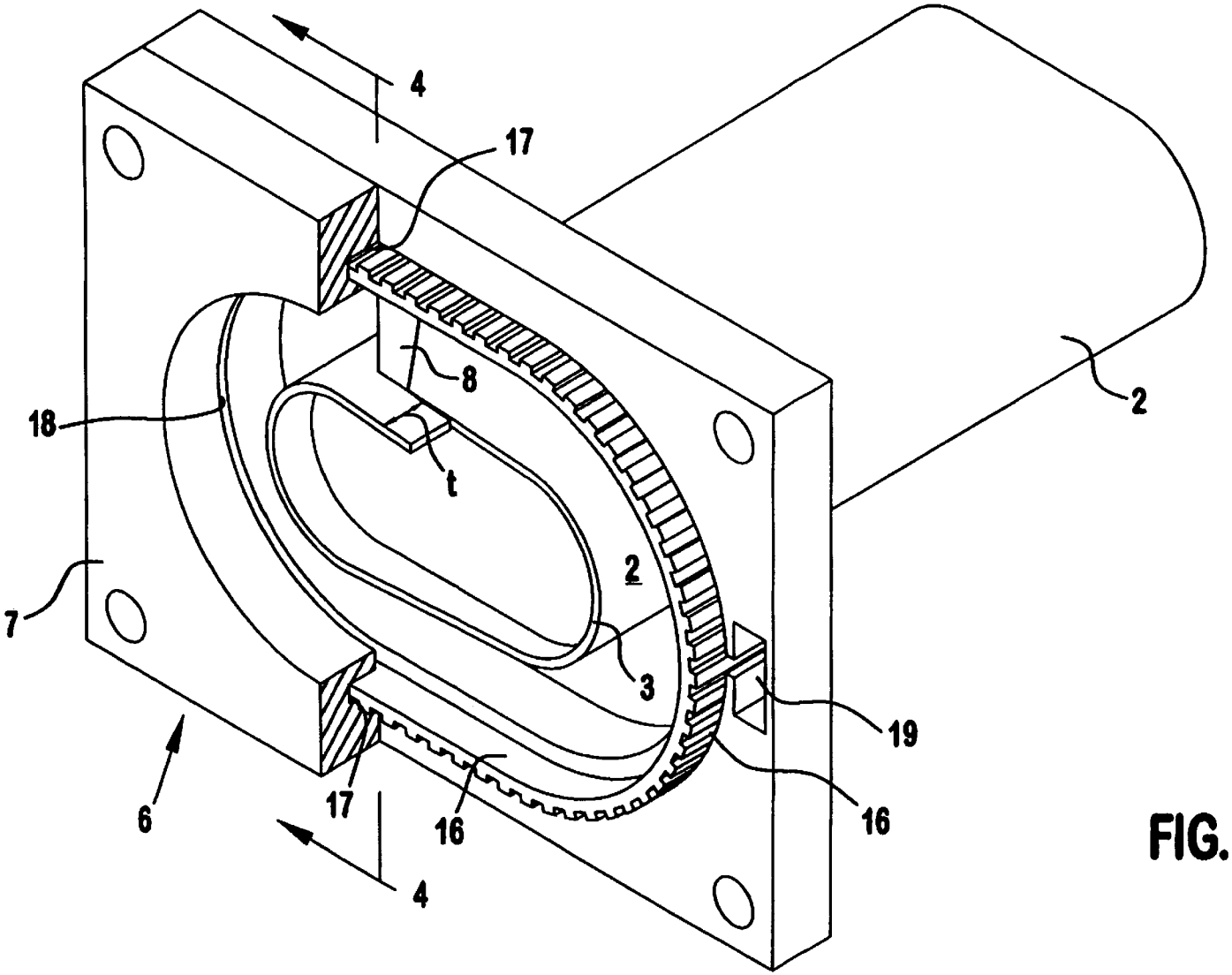
FIG. 3 is a perspective view of the apparatus of FIG. 1 with a portion of the cutter housing being partially broken away.
Figure 4:
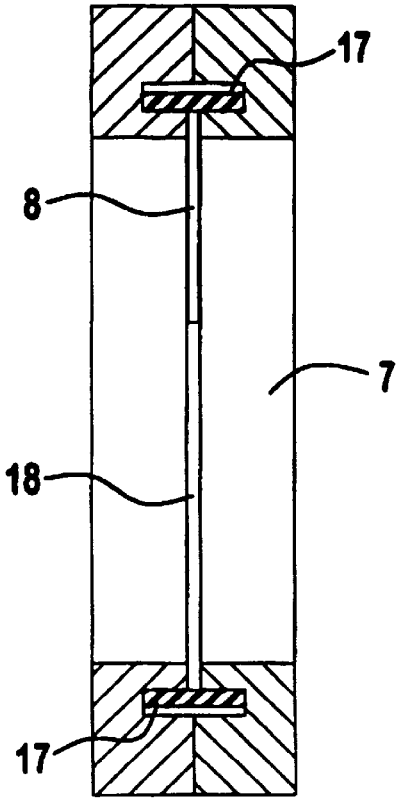
FIG. 4 is a cross-section taken along line 4—4 in FIG. 3.

FIGS. 1 and 2 illustrate a first preferred embodiment of the cutting device 6. The housing 7 supports the cutting tool 8 that creates the coil 10 from tube 2. A groove 16 is located in housing 7 and receives a drive belt 17, as shown in FIG. 2. As shown in FIG. 3, a chamber 19 is located adjacent the groove 16, and receives a means for driving the belt 17, such as a drive gear which engages and advances the belt. The cutting tool 8 preferably passes through a slot 18 that extends inwardly from the groove 16 and is advanced by the drive belt 17 as it moves within the groove 16. The slot 18 is dimensioned to allow passage of the tool 8 through the groove 16 while stabilizing the cutting edge 14 against vibration and other mechanical deflections. This is illustrated in FIG. 4. The belt 17 may be driven by an electric motor or pneumatic or fluid means, not shown, such as will be known to those skilled in the art.

Figure 5:
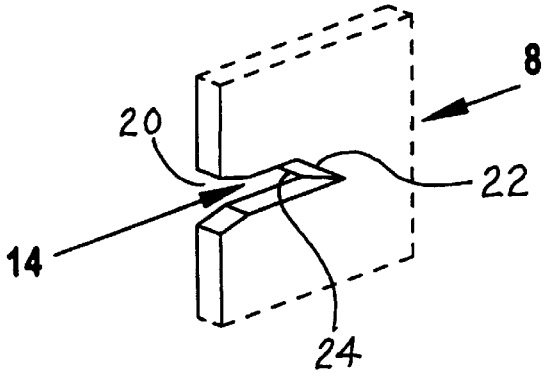
FIG. 5 illustrates a cutting tool used in the apparatus of FIG. 1.

Referring now to FIG. 5, a preferred cutting edge 14 on the tool 8 is shown in detail. The cutting edge 14 on the tool 8 is preferably formed by a notch 20, having an angled base 22 with a sharp edge 24. Preferably, the notch 20 is sized to receive the wall 3 of the tube 2, with the thickness of the wall 3 being approximately equal to or less than the opening of the notch 20. In a preferred embodiment, the opening of the notch 20 is chamfered to provide a lead-in surface for receiving the wall 3 of the tube 2.

Figure 6:
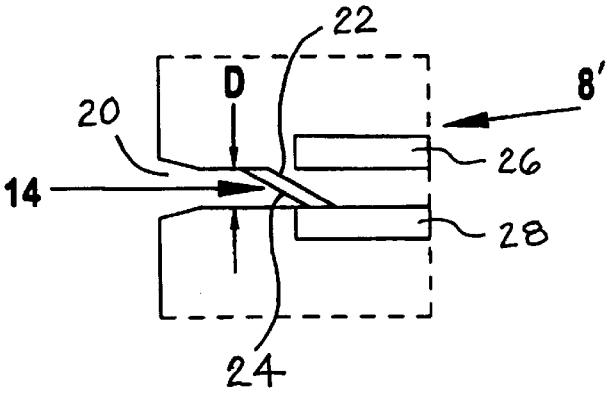
FIG. 6 illustrates a cutting edge profile for the cutting tool of FIG. 5.
Figure 7:
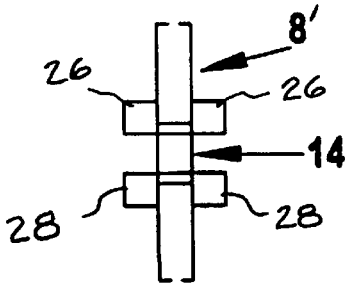
FIG. 7 illustrates a cutting edge with coil smoothing means.

Referring now to FIGS. 6 and 7, an alternate embodiment of the tool 8' is shown. The alternate embodiment of the tool 8' includes smoothing bars 26 and 28 located generally behind the cutting edge 14 in the cutting direction. The smoothing bars 26, 28 hold the cut portion of the coil 10, parallel to the tube 2 in the area directly after the cut is formed to smooth the cut edges and to prevent tearing and/or uneven cutting as the cutting edge 14 is carried through the wall 3 of the tube 2 to form the coil 10. This provides for a more uniform and consistent cut. Preferably the opening D is equal to the all thickness of the coil 10 and is in the range of about 0.3 to 0.7 mm.

Figure 8:
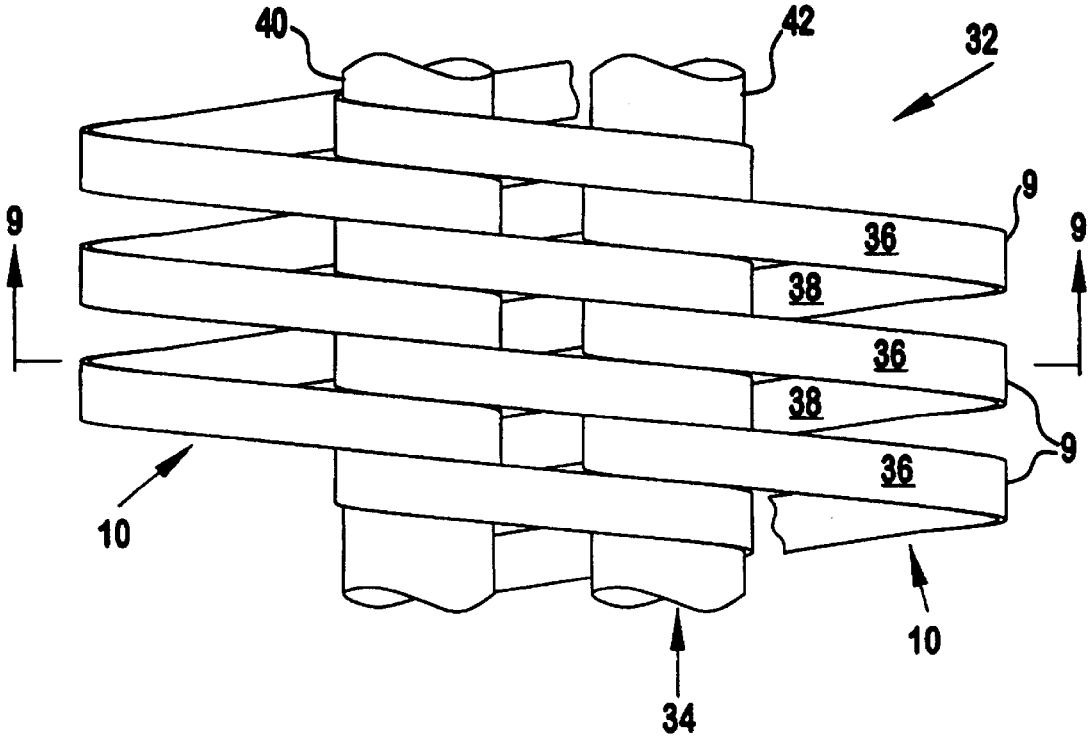
FIG. 8 is a top plan view of a fabric fragment having intermeshed spiral coils.
Figure 9:
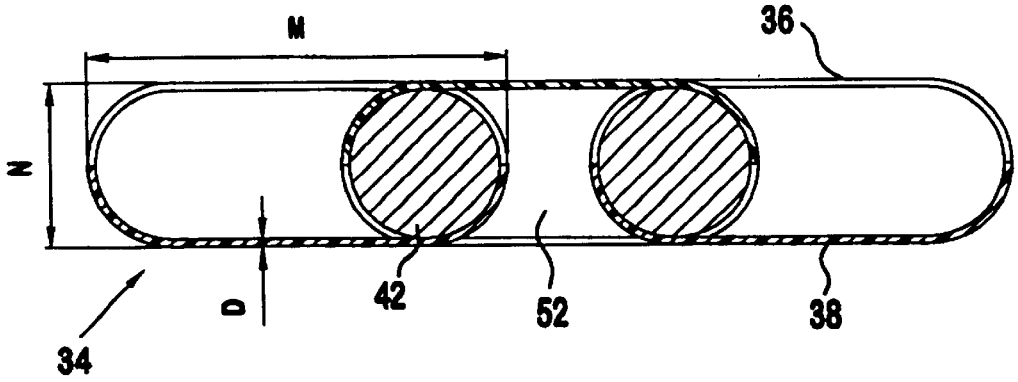
FIG. 9 is a cross-section taken along line 9–9 in FIG. 8.

Referring now to FIGS. 8 and 9, there is shown a small portion of a fabric 32 that is comprised of a plurality of intermeshed spiral coils 10 in accordance with the present invention which are retained in the intermeshed condition by a plurality of pintles 40, 42. As shown in FIG. 9, the major axis M represents the length and the minor axis N represents the caliper or height of the coil 10. The major axis M is preferably in the range of 5 to 10 mms and the minor axis N is preferably in the range of 2 to 4 mm. The wall thickness D of the coil 10 is preferably in the range of 0.3 to 0.7 mm, and is approximately equal to the opening height D of the notch 20 used to form the cutting edge 14 in the tool 8. Filler strands may be inserted in the open channels 52 if it is desired to further reduce the permeability of the fabric 32.

Those skilled in the art will recognize from the present disclosure that the coils 10 can be utilized to form an entire fabric 32 or may be used to form only a portion thereof, such as a seam to connect two ends of a woven fabric together to form an endless belt.

The hollow tube 2 can be made of any extrudable polymer, and in any number of shapes or sizes. Currently, preferred coil shapes are oval with flat top and bottom surfaces. Currently preferred polymers are PET; PA; PPS/PEEK. However, those skilled in the art will recognize from the present disclosure that other suitable materials may be utilized to form the tube 2, if desired.

Preferably, the material is processed through a single screw extruder at the required melt temperature and extruded through a die head having the desired tube profile. The extrudate is then fed directly to the cutting device 6 to form the coil 10. Preferably, the extrusion process results in either random orientation of molecules in the extruded tube 2, or, to the extent that the molecule strands are oriented, they are oriented generally in the direction of flow 0, as shown in FIG. 1. Because of the cutting and assembling process, the molecules in the final coils 10 and fabric 32 are either randomly oriented or generally oriented perpendicular or transverse to the direction of travel of coil 10 or fabric 32 on a paper making machine. This is similar to what may be found in an injection molded coil.

As shown in FIG. 8, the longitudinal portions of the coil 10, as indicated by coil portions 36, are oriented in the machine direction and running generally perpendicular to the extruded molecules flow direction, as indicated by arrow 34. Similarly, the interconnecting portions, as indicated by 38, are generally oblique to the extruded molecules' flow. The head curves 9 will have intermediate portions of each. No portion of the coil 10 in the fabric 32 has an extended orientation parallel to the orientation of the original tube 2.

Since the extruded tubes are not subjected to a post extrusion draw, the coil 10 will not be oriented in the manner of a conventional monofilament. The lower level of orientation results in a generally tougher coil that is more closely likened to an injection molded product. The absence or reduction of directional orientation reduces the thermal and moisture reactivity in the same direction, and to the extent that any orientation of molecules would generally be in the extrusion direction O (shown in FIG. 1), this is transverse to the machine direction in the finished fabric or portion of fabric in which the coil 10 is used.

Figure 10:
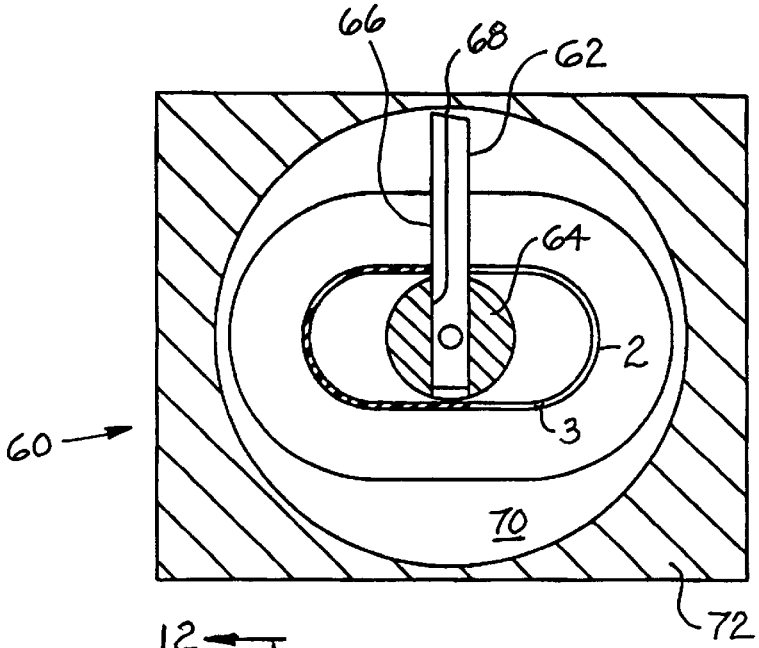
FIG. 10 is a cross-section similar to FIG. 2 of a second embodiment of an apparatus for converting an extruded hollow tube into a hollow coil.

Referring now to FIG. 10, a second embodiment 60 of the cutting device is shown. In the second embodiment of the cutting device 60, a cutting tool 62 is mounted on a centrally located shaft 64. Preferably, the cutting tool 62 includes an elongated cutting edge 66. The cutting tool 62 is rotated by the central shaft 64 to cut the coil 10 from the tube 2. Preferably, the free end 68 of the cutting tool 62 is constrained to travel within a slot 70, formed in the housing 72 of the cutting device 60. The slot 70 is sized to stabilize the cutting tool 62 to prevent vibration or mechanical deflection as the cutting edge 66 cuts the tube 2 to form the coil 10. Preferably, the feed rate of the tube 2 through the cutting device 60 is coordinated with the rotation speed of the cutting tool 62 in order to form a uniform coil 10 in the same manner as described above in connection with the cutting device 6 in accordance with the first embodiment. The central shaft 64 is preferably rotated via a controllable pneumatic or electric motor.

Figure 11:
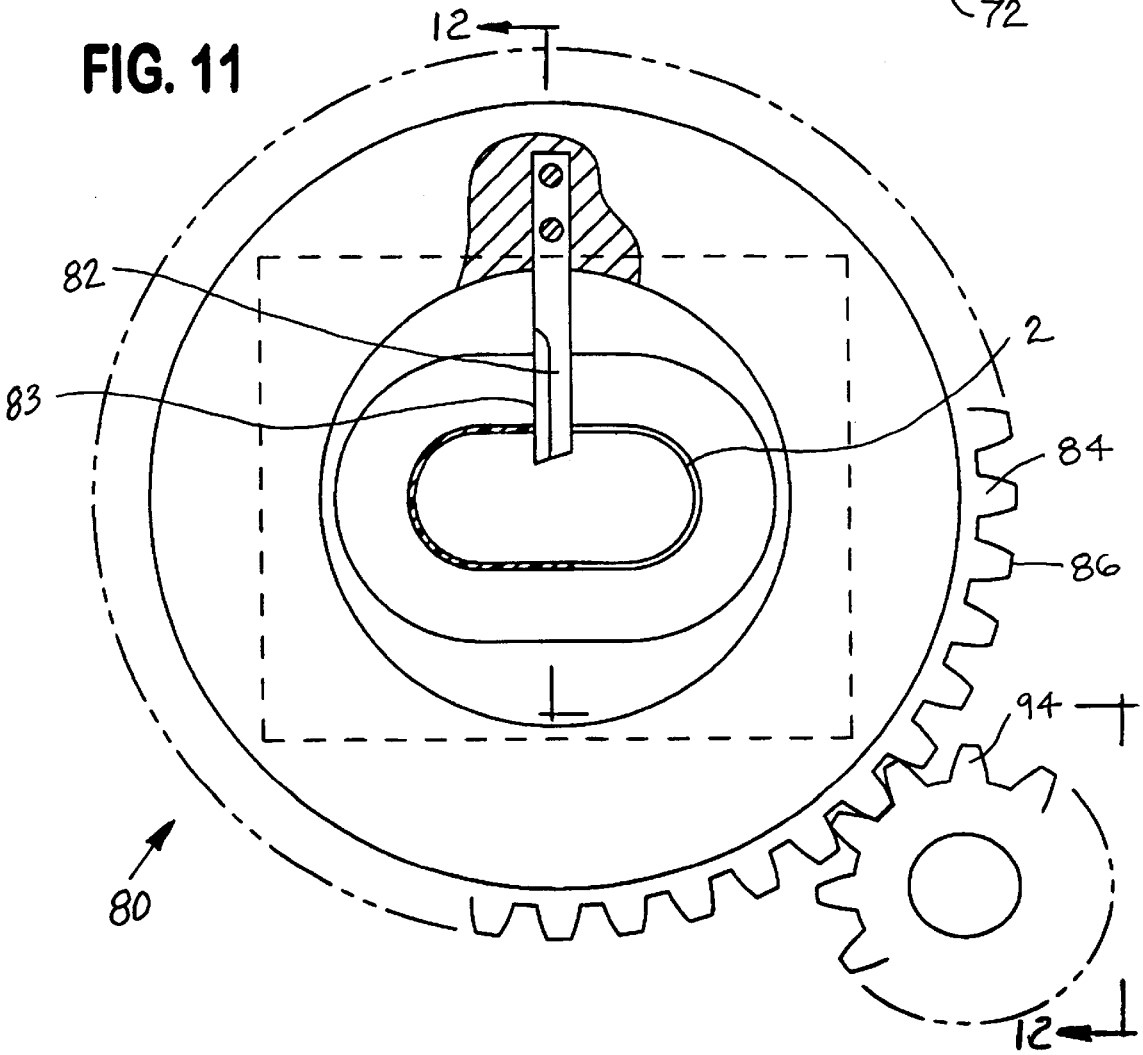
FIG. 11 is an elevational view, partially broken away, of a third embodiment of an apparatus for converting an extruded hollow tube into a hollow coil.
Figure 12:
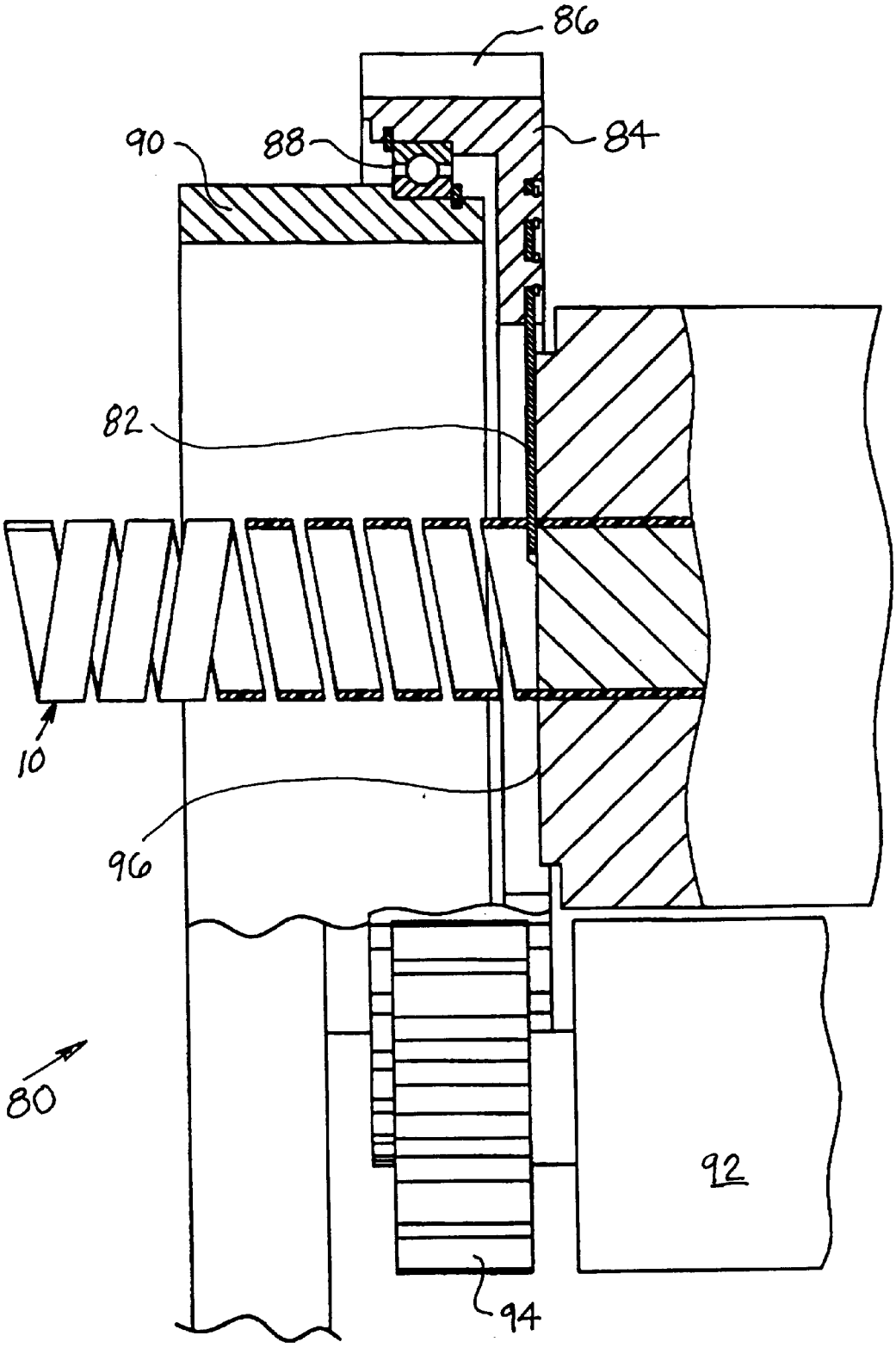
FIG. 12 is a cross-section taken along line 12–12 in FIG. 11.

Referring now to FIGS. 11 and 12, a third embodiment of the cutting device 80, in accordance with the present invention is shown. The cutting device 80 includes a cutting tool 82 having a cutting edge 83. The cutting tool 82 is mounted on a ring gear 84 for rotary movement about the tube 2. The ring gear 84 is supported by a roller bearing 88 mounted on a support 90. The ring gear 84 is driven via a drive motor 92, having a drive gear 94 which engages the gear teeth 86 of the ring gear 84. The speed of the motor 92 is coordinated with the extrusion rate of the tube 2 in order to cut the uniform coil 10. Preferably, the cutting device 80 is located adjacent to the extruder dye face 96 and the cutting tool 82 is moved along the dye face 96 as the tube 2 is being extruded to form the coil 10.

Due to the oval shape of the tube 2, the cutting edges 66, 83 on the cutting tools 62, 82 must be elongated since the area of the cutting edge 83 on the cutting tool 82 contacting the tube 2 will vary, depending upon the location of the cutting tool 82.

Preferably, the motor 92 is a controllable electric or pneumatic motor, such that the speed of the motor can be controlled to a desired rate.

It will be appreciated by those skilled in the art that changes can be made to the preferred embodiments of the cutting device described above, as well as to the shape and size of the coil formed by the cutting tools, without departing from the broad inventive concept of the present invention. The size of the coils and fabrics made therewith can also be altered, as desired. It is understood, therefore, that the invention is not limited to the particular embodiments disclosed, and is intended to cover modifications within the spirit and scope of the present invention.

I claim:

1. A process for producing spiral coils, said process comprising the steps of:

extruding a polymeric tube with a generally random molecular orientation; and cutting the tube into spiral coils having longitudinal portions interconnected by headcurves with the molecular orientation within the spiral coil being randomly oriented with respect to the longitudinal portion.

2. A method for producing spiral coils of a type suitable for use in a papermaking fabric, the method comprising:

producing an extrudate having a substantially uniform, predetermined shape; and providing a tool that cuts the extrudate into a plurality of spiral coils.

3. A fabric of a type comprised of interconnected spiral coils having a plurality of longitudinal portions extending between headcurves, the coils characterized by:

a random molecular orientation.

* * * * *